Feb. 1, 1944.   W. T. BARKER, JR   2,340,729
APPARATUS FOR AND METHOD OF FEEDING MOLTEN GLASS
Filed July 14, 1939   5 Sheets-Sheet 2
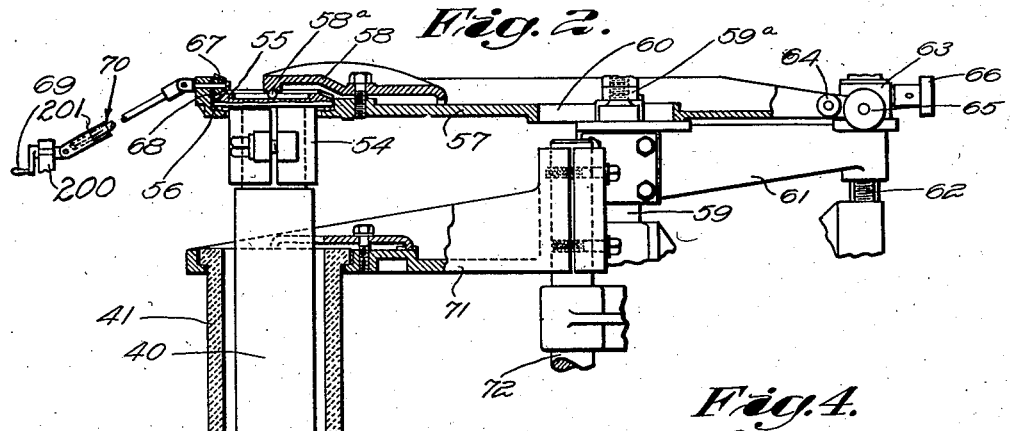
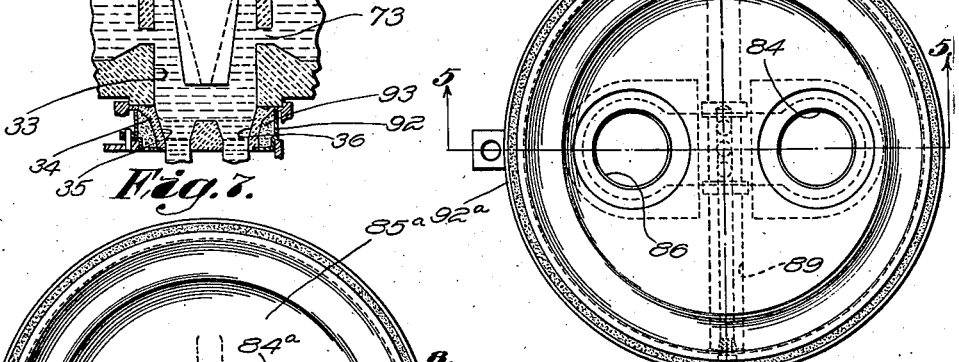
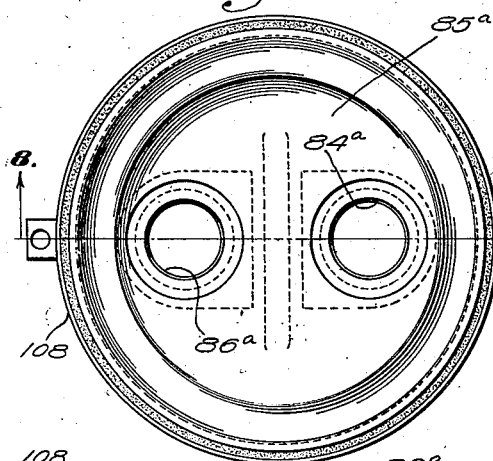
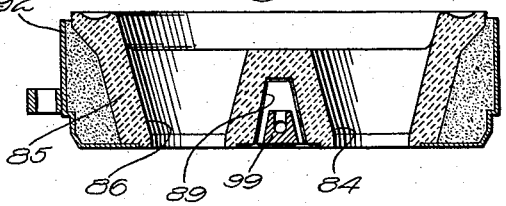
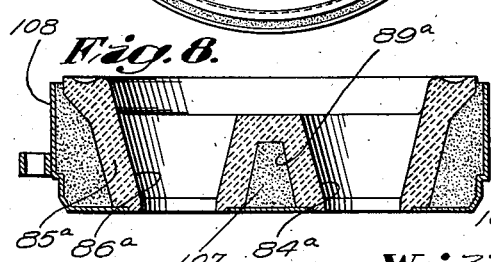
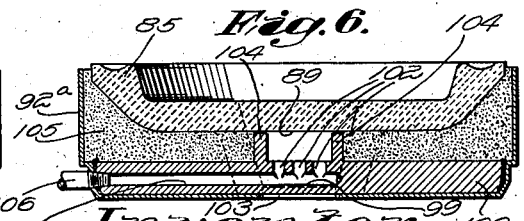
Witness
W. B. Thayer.
Inventor
William T. Barker Jr.
by Brown & Parham
Attorneys Feb. 1, 1944.  W. T. BARKER, JR  2,340,729
APPARATUS FOR AND METHOD OF FEEDING MOLTEN GLASS
Filed July 14, 1939  5 Sheets-Sheet 3
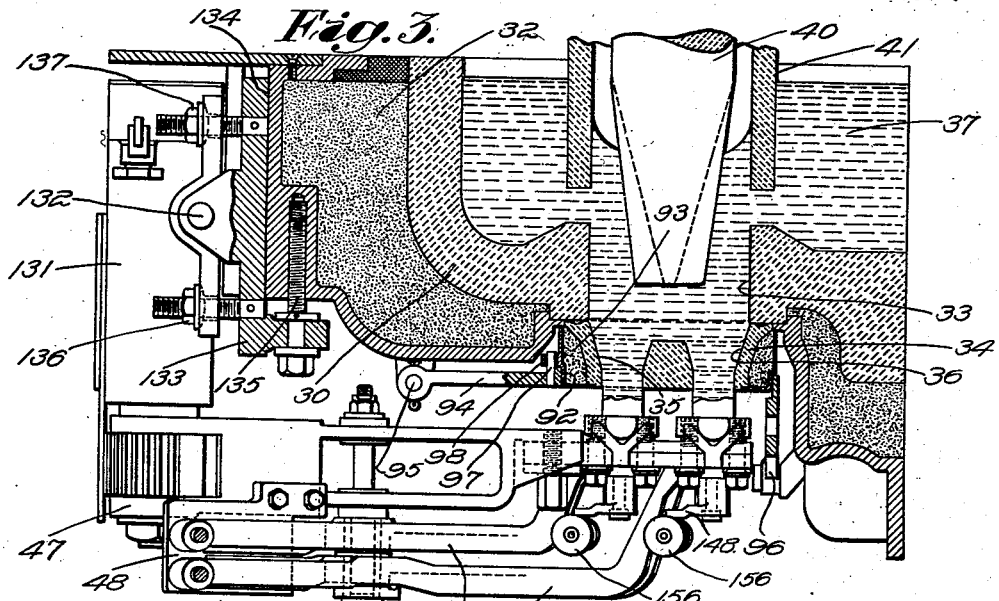
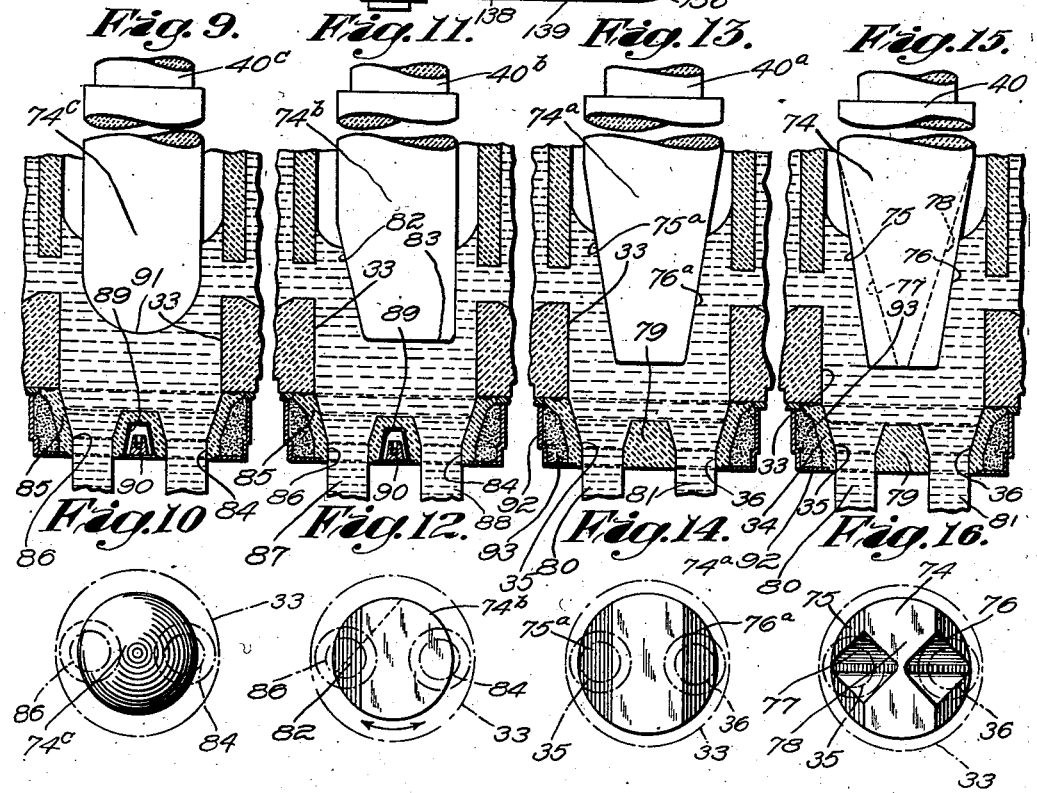
Witness
W. B. Thayer
Inventor
William T. Barker Jr.
by Brown & Parham
Attorneys Feb. 1, 1944. W. T. BARKER, JR 2,340,729
APPARATUS FOR AND METHOD OF FEEDING MOLTEN GLASS
Filed July 14, 1939 5 Sheets-Sheet 4
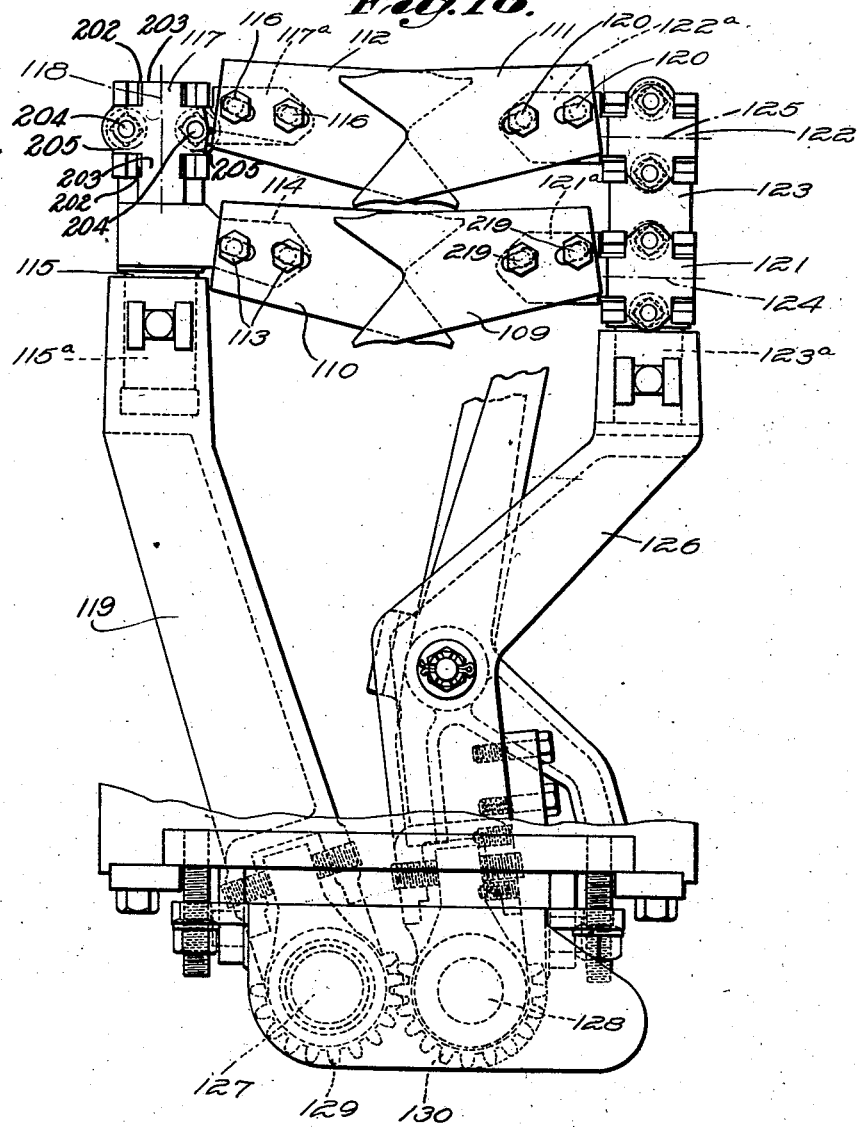

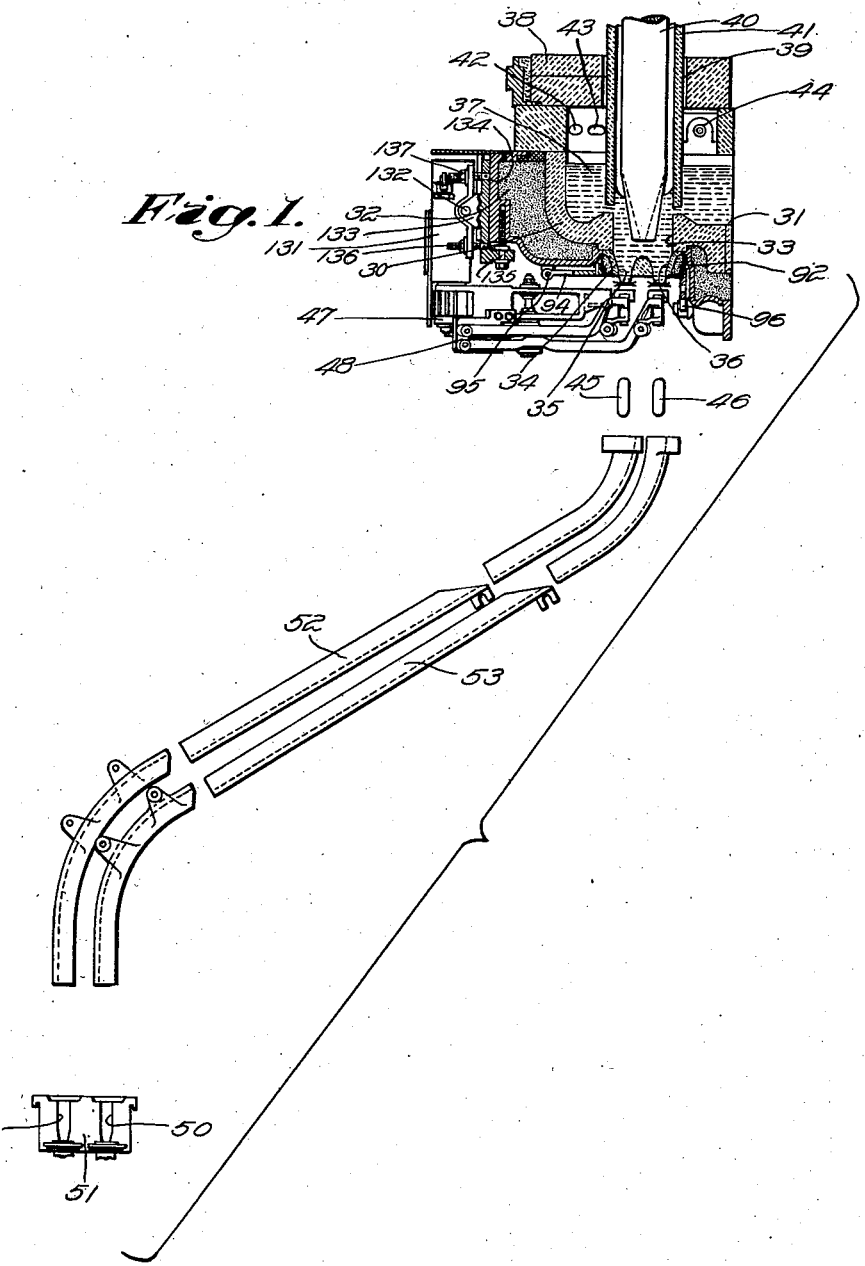

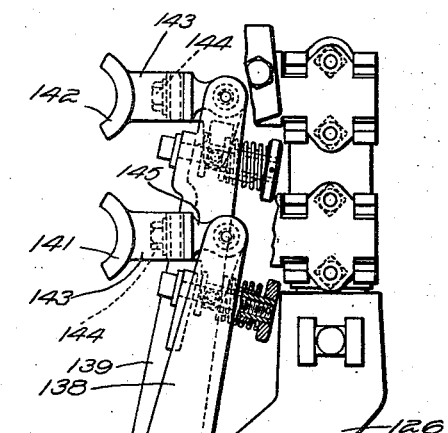

Patented Feb. 1, 1944

2,340,729

UNITED STATES PATENT OFFICE 2,340,729

APPARATUS FOR AND METHOD OF FEEDING MOLTEN GLASS

William T. Barker, Jr., West Hartford, Conn., assignor to Hartford-Empire Company, Hartford, Conn., a corporation of Delaware Application July 14, 1939, Serial No. 284,391

17 Claims. (Cl. 49—55)

This invention relates to the art of feeding molten glass from a supply body in a forehearth or other suitable container in mold charges of suitable size, shape and condition to be formed into satisfactory articles of glassware by associate glassware forming machinery. The invention relates more particularly to apparatus of a unitary character by which a plurality of charges of the character described are produced and delivered to associate forming machinery at each cycle of operations of the feeding apparatus.

An object of the invention is to provide a practical, efficient and reliable automatic glass feeding apparatus having a plurality of glass feed outlets and associate mechanisms adapted by their conjoint and cooperative functioning to produce at the same time continuous series of commercially satisfactory successive charges and to regulably control within an adequate commercial range the formation and delivery to associate glassware forming machinery of the successive charges of each such series.

Another object of the invention is to provide a glass feeding apparatus having a glass feeding container provided with a plurality of glass feed outlets and adapted by reason of the novel and improved character of the coordinated, cooperative glass feed control, charge severing, and charge delivery features of such apparatus to produce and deliver to mold cavities of an associate glassware forming machine as many regular series of mold charges of predetermined, dependably maintained, regulable size and shape and of suitable thermal condition as there are feed outlets in the apparatus.

A further object of the invention is to provide an improved glass feeding apparatus of the character described which will afford adequate facilities for controlling the formation and delivery of the charges obtained from glass fed from the supply body in the feeding container through each of the feed outlets to permit predetermination and selection of the size and shape of such charges from a range of sizes and shapes sufficiently extensive to include all those best suited to the molds of associate glassware forming machinery when the latter is employed for the manufacture of glassware of any usual size and shape for which such machinery is adapted and to maintain commercial uniformity of the successive charges of the series produced for each feed outlet and of corresponding charges of the several series despite differential conditions and variations therein existing or occurring at or adjacent to the several outlets and tending to prevent or impair such uniformity.

A glass feeding apparatus for accomplishing the foregoing and other objects of the invention includes many novel and improved features, among which are those which are concerned with controlling the discharge of glass from the several feed outlets, suspending the glass issuing from such outlets in suspended mold charge masses, separating mold charges from the suspended masses and delivering the charges obtained to associate forming machinery.

An improved mechanism is provided according to the present invention for controlling the flow of glass to and through the feed outlets so that like charges may be obtained from glass issuing from the several outlets despite variations in the temperature and viscosity of the glass at different outlets or at different parts of one or more of the outlets.

A further feature of improvement is the provision of novel outlet structure and temperature control means in conjunction therewith for preventing the mold charge masses issuing from and accumulating in suspension below such outlets from canting or warping laterally from the vertical.

The invention also provides improved mechanisms for severing glass charges from suspended mold charge masses below the several outlets and for controlling the delivery of the several charges produced at each cycle of operations of the feeding apparatus to the mold cavities for which these charges are intended.

These and other features of the invention will be understood from the following description of a glass feeding apparatus embodying the invention and of several alternative or modified forms of improved mechanisms which may be included therein, as shown in the accompanying drawings, in which:

Fig. 1 is a view, mainly in side elevation and partly in vertical section, showing an assembly of component mechanisms of the improved glass feeding apparatus;

Fig. 2 is a fragmentary relatively enlarged view, showing a portion of the glass feeding container with plural feed outlets and a reciprocable plunger and associate tube for controlling the feeding of glass to and through said outlets, together with structure for operatively supporting the plunger and tube;

Fig. 3 is a longitudinal vertical section through the glass holding lower portion of the feeding container, showing an improved mounting for adjustably supporting the glass severing mechanism;

Fig. 4 is a plan view of one form of outlet structure contemplated by the present invention;

Fig. 5 is a transverse vertical section through the outlet structure of Fig. 4, substantially along the line 5—5 of Fig. 4;

Fig. 6 is a transverse vertical section through the same outlet structure, substantially along the line 6—6 of Fig. 4;

Fig. 7 is a plan view of another form of outlet structure contemplated by the invention;

Fig. 8 is a section along the line 8—8 of Fig. 7;

Fig. 9 is a fragmentary vertical sectional view of a portion of the glass feeding container, including the form of outlet structure that also is shown in Figs. 4 to 6, inclusive, and also showing one form of reciprocable plunger which may be employed in conjunction therewith;

Fig. 10 is a bottom plan view of the plunger shown in Fig. 9 with the underlying outlet structure indicated by dot and dash lines;

Fig. 11 is a view similar to Fig. 9 but showing a different form of plunger;

Fig. 12 is a view similiar to Fig. 10 but showing the form plunger of Fig. 11;

Fig. 13 is a view similar to Figs. 9 and 11, showing a still different form of plunger and the form of outlet structure of Figs. 1, 2 and 3;

Fig. 14 is a view similar to Figs. 10 and 12, showing the bottom end of the plunger of Fig. 13;

Fig. 15 is a view similiar to Figs. 9, 11 and 13 but showing the form of plunger and the outlet structure of Figs. 1, 2 and 3;

Fig. 16 is a view similar to Figs. 10, 12 and 14 but showing the bottom end of the plunger of Fig. 15;

Fig. 17 is an edge view of the shear blades, showing certain details of the holders for such blades;

Fig. 18 is a plan view of the shear mechanism;

Fig. 19 is a plan view showing one of the shear arms and the associate mechanism for adjustably supporting and operating a pair of charge guiding members; and Fig. 20 is a view showing details of a portion of the mechanism for adjustably supporting and operating one of the charge guiding members.

General construction and operation

Glass feeding apparatus of the invention includes a glass feeding container. This glass container may be the glass feed bowl or discharge chamber, indicated at 30, Figs. 1 and 3, of a forehearth to which molten glass may flow from a melting tank or furnace (not shown). A portion of the forehearth flow channel is indicated at 31 in Fig. 1. The glass container 30 may be formed of any suitable refractory material and may be provided at its exterior with suitable insulation, indicated at 32.

In general, and except as to novel features which will be pointed out, the glass container and the means for supplying molten glass thereto may be of any suitable known or preferred construction. One form of forehearth structure of this description is disclosed in Patent No. 1,760,-254, granted May 27, 1930, to Karl E. Peiler, assignor to The Hartford-Empire Company.

The glass container 30 is provided with a vertical opening 33 in its bottom, the vertical extent of which is sufficient to provide a discharge or feed well or flow passage of substantial depth. An outlet ring 34 is located at the bottom of the container 30 at the lower end of the well 33. This outlet ring is formed according to the present invention to provide a plurality of adjacent feed orifices. In the example shown, there are two of these orifices, designated 35 and 36, respectively, spaced along a line running from the rear or receiving end of the container 30 to the front or outer end thereof. In the practice of the invention, a supply body of molten glass 37 in the feed chamber continuously submerges the well 33 and the orifices 35 and 36 and is maintained at a substantially constant level.

The container 30 may be provided with a cover structure 38, provided with an opening such as that indicated at 39, Fig. 1, to accommodate a vertically reciprocable refractory plunger 40 and a stationary but vertically adjustable refractory tube 41. The lower end portions of the plunger 40 and tube 41 depend into the glass supply body 37 in desirable relations to the well 33 and the feed orifices 35 and 36.

The cover structure 37 is shown as having lateral openings, as at 42, 43 and 44, above the level of the glass supply body, for accommodating burners (not shown). It is intended that the glass in the feed chamber and passing through the discharge well 33 to the orifices 35 and 36 should be kept as nearly as possible at a desirable, selected temperature, suitable for the glass feeding operations, and as nearly uniform in temperature and homogeneous as possible. To this end, any suitable or preferred temperature and viscosity regulating or control means may be employed.

Glass is fed from the supply body through the orifices 35 and 36 so as to produce successive suspended mold charge masses below these orifices. Charges, such as those indicated at 45 and 46 in Fig. 1 are severed from the suspended mold charge masses at regular selected intervals of time by the blades of a shear mechanism, indicated at 47. The charges are steadied and guided at the time of their severance by a mechanism 48 associated with the shear mechanism, both of which will hereinafter be further described.

The charges 45 and 46 are intended for the cavities 49 and 50 of a plural-cavity mold 51. These cavities may be in separate molds. The molds may be included in any suitable or preferred associate forming machine (not shown). These charges may be guided to their respective mold cavities by suitable delivery troughs 52 and 53, respectively. Each of these troughs may comprise a plurality of longitudinally spaced sections which individually are of suitable construction to receive the falling charge when its axis is substantially vertical and to deliver the charge vertically to its mold cavity when the latter is located at a lower level and at a substantial distance laterally from the axial line of the feed orifice through which the glass of the charge was discharged. All the details of the trough mechanisms are not shown as they may be of any suitable known design and construction. For example, each of the trough mechanisms may be substantially like that which is disclosed in Patent No. 1,911,119, granted May 23, 1933, to Henry W. Ingle, assignor to The Hartford-Empire Company. If the operating assembly of the feeding apparatus and its associate forming machine will permit, the charges may be delivered vertically downward to their mold cavities, either freely through the air or by the use of any suitable known guiding means.

In general, the feeding of the glass from the supply body through the well 33 and the orifices 35 and 36 usually will be intended to produce for each cycle of operations of the feeding apparatus and at regular intervals a pair of charges of identical, selected shape and weight and of like thermal condition or consistency, suitable for the mold cavities to be charged. The delivery mechanism should be effective to deliver the charges properly to their respective mold cavities. In actual practice, many factors, including temperature differentials between different portions of the glass being fed, unavoidable and unpredictable variations in the temperature and viscosity of different portions of the glass passing to and through the different orifices, different or varying external influences on different portions of the glass masses passing through and issuing from the different orifices, charge severing and guiding difficulties, etc., militate against satisfactory feeding of simultaneously produced and simultaneously delivered identical plural charges uniformly in regular cycles throughout an operating period of substantial duration and in such manner that the weight and/or shape of the plural charges may be changed at will within wide ranges as service conditions may require and be dependably maintained after each such change. The present invention eliminates or substantially reduces the difficulties caused by or incident to these factors by providing improved individual and combined or cooperative features of construction and operation of the complete feeding apparatus, whereby harmful or adverse factors or changes in operating conditions are more effectually controlled, obviated or compensated for. The several components of my improved feeding apparatus will now be described.

*Mechanism for controlling feeding of glass to and through the orifices*

A plunger adjusting and operating mechanism is shown in Fig. 2. It includes a chuck or holder 54 having at its upper end an enlarged or flanged head portion 55 rotatively supported, preferably anti-frictionally, in a counterbore seat or socket 56 in the outer end portion of a carrying arm 57 and retained therein by a clamping device 58.

The carrying arm 57 is reciprocable vertically by means adequate to permit adjustment vertically of the position and also adjustment of the amplitude of the plunger stroke or either of them. The arm 57 is adjustable horizontally in the direction of length thereof and also in opposite directions substantially at right angles to such direction. To reciprocate the plunger in such manner as to permit these adjustments or any of them, the carrying arm 57 may be supported and operated by mechanism substantially as disclosed in Figs. 15, 16, 22 and 23 of the Peiler Patent No. 1,760,254, aforesaid. This structural arrangement includes a vertically reciprocable guided shaft 59, the upper end portion of which extends through a slot 60 in an intermediate portion of the arm 57. The shaft 59 carries a rearwardly extending bracket 61 on which the intermediate portion of the arm 57 is slidably supported and to which such portion of the arm is releasably clamped by a clamping member 59a. The bracket 61 carries a vertical post 62. A square collar 63 surrounds the upper end portion of the post 62 and is connected by a horizontal hinge or pivot pin 64 with the rearward end of the plunger carrying arm 57. Lateral hand screws, one of which is indicated at 65 and a rear hand screw 66 are journaled in the walls of the collar 63 at right angles to one another, and are threaded into the post 62. These hand screws may be adjusted when the clamping member 59a has been loosened to adjust the arm 57 relatively to the axis of the shaft 59 in a fore or aft direction or angularly about such axis in either of opposite directions. The plunger 40 thus may be centered in respect to the well 33 or may be adjusted fore or aft in such well or laterally in either direction therein. Further details of the mechanism for supporting and operating the plunger, including adjustments for varying during operation either the vertical position of the plunger stroke or the amplitude thereof are fully explained in the aforesaid Peiler Patent No. 1,760,254.

For rotary adjustment of the plunger, as may be desirable when plungers of a certain shape or certain shapes are employed, as hereinafter explained, a mechanism substantially as shown in Fig. 2 may be employed. This mechanism includes a beveled gear 67 engaging with teeth 68 in the upper annular face of the flange portion of the head of the chuck or holder 54. The gear 67 is operable by a handle 69 and an intervening extensible jointed shaft 10. Any suitably known structural arrangement may be employed to support the mechanism for operating the gear 67 so that such mechanism will not interfere with vertical reciprocatory movements of the plunger 40. One such arrangement is shown in Fig. 2 in whch the handle 69 is a crank having its axle journalled in a stationary support 200. The shaft 70, which is pivotally connected at one end with the axle of the crank 69 and at its other end with the axle or shaft of the gear 67, comprises sections having overlapping end portions telescopically engaged with each other, as indicated at 201. These are of course suitably shaped in cross-section to permit relative longitudinally sliding movements between such sections as the plunger 40 is raised and lowered while preventing relative rotary movements between them at all times. In order to permit such angular adjustment to be made during operation so that the effects thereof may be observed, the clamping device may be such as to retain the chuck or holder in its seat in the arm 57 by pressure exerted on the head of such chuck or holder through a ball bearing member 58a located at the upper end of the vertical axis of the chuck or holder.

The tube 41 may have a flanged upper end portion secured in a seat in the outer end portion of a supporting arm 71. This supporting arm may be secured to a vertically adjustable shaft 72 so that the tube 41 may be lowered onto the curb at the upper end of the well 33 completely to shut off the flow of glass from the supply body to the well or located with its lower end at any selected distance above the upper end of the well so as to provide a submerged annular flow passage 73 of a predetermined heighth at the upper end of the well. The structure for supporting and adjustably mounting the tube 41 may be substantially as disclosed in the aforesaid Peiler Patent No. 1,760,254. If desired, the supporting mechanism for the tube 41 may be suitable to permit or cause rotation thereof during glass feeding operations. Suitable means for rotating such a tube are well known in the art of feeding molten glass.

Plungers having lower end portions of various shapes and sizes may be used in the feeding of molten glass from plural orifices in accordance with the present invention. As best seen in Figs. 15 and 16 the lower end portion 74 of the plunger

40, hereinbefore referred to, is beveled or cut-away at its front and rearward sides, as indicated at 75 and 76, respectively, so as to be wedge shaped as viewed from the side. The beveled front and rear face portions 75 and 76 are similarly grooved vertically intermediate their side edges, as at 77 and 78, respectively, preferably to such an extent that the lower end of the plunger 40 will not overlie the orifices 35 and 36 of the orifice ring 34 when the plunger 40 is centered in the well 33. With this construction, the down stroke of the plunger 40 acts to expel glass from the orifices 35 and 36 without exerting any force in a straight vertical line on any portion of glass in either of the orifices. The arrangement just described obviates any impelling action on the glass discharging from the orifices of a character to cause fore and aft canting or curvature away from each other of the accumulating suspended mold charge masses. This is of substantial advantage in the feeding of glass from a plurality of adjacent orifices in order to obtain straight mold charge masses in suspension from such outlets, such, for example, as those designated 80 and 81, respectively, and partially shown in Fig. 15.

The plunger shown in Figs. 15 and 16 has the further advantage of being well adapted to aid in providing regulable control and adjustment of the weights of the mold charges which may be severed at regular, selected intervals from successive mold charge massses in suspension from the feed orifices. Thus, if the glass passing downwardly to the front orifice 35 should become cooler and more viscous than the glass passing to the rear orifice 36 and hence tend to produce charges of lighter weight, the plunger 40 may be adjusted in a rearward direction from a centered position in the well 33. This will enlarge the down passage for molten glass to the front orifice and correspondingly reduce the size of the down passage to the rear orifice. Like suspended mold charge masses may thus be obtained below the respective orifices between successive operations of the associate severing mechanism. This fore or aft or other horizontal adjustment of the plunger 40 may be effected without causing any substantial change in the effect of the plunger strokes on the shape of the suspended mold charge masses and hence independently of a change of shape of the severed charges.

The vertical position of the plunger 40 and the amplitude and character of its strokes may be adjusted and selected according to the effects desired and may be different for charges of different sizes and/or shapes.

A plunger 40a having a lower end portion 74a of modified form and affording some of the advantages of the plunger 40 is shown in Figs. 13 and 14. The plunger 40a thus has a wedge shaped lower end as viewed from the side and differs from the plunger 40 only in that it lacks the vertical grooves 77 and 78, respectively of the plunger 40. The lower end of the plunger 40a is, however, sufficiently reduced in thickness that it will not exert objectionable direct extrusive pressures on the portions of glass next to the division wall 79 between the orifices when the plunger is centered in the well 33. The plunger 40a may be adjusted fore and aft to adjust the effective relative sizes of the vertical glass flow passages at its front and at the read sides, respectively, to regulably control the weight of the respective mold charge masses in suspension from the orifices, substantially as explained for the plunger 40. Most fore or aft or other horizontal adjustments of the plunger 40a will not substantially change the shape controlling effects of the plunger strokes.

In Figs. 11 and 12, I show a plunger 40b having a lower end portion 74b of a still different shape. The portion 74b of the plunger 40b has its front face beveled or cut away, as indicated at 82, but may be otherwise of circular configuration. As shown, the lower end 83 of the plunger 40b overlies substantially the entire rear orifice, designated 84, of an outlet ring 85 and relatively very little of the front orifice 86 of such outlet ring when the plunger 40b is centered in the well 33. This centered position of the plunger 40b tends to permit greater flow of glass downwardly through the orifice 86 in a given time than through the orifice 84, assuming glass of like temperature and viscosity at both the front and rearward sides of such plunger. However, the greater direct impelling action of the plunger on the glass in the orifice 84 tends to force more glass downwardly through this orifice than through the orifice 86 during at least part of each down stroke of the plunger. The effect will vary according to the position of the plunger relatively to the front and rearward walls of the well 33 and according to the vertical position of the path of the plunger strokes with respect to the orifices and the character of such strokes. By suitable selection of all these factors, mold charge masses of like size, weight and shape may be concurrently produced. When a plunger having a lower end portion of the shape shown in Figs. 11 and 12 is used, particularly for the production of charges within the range of smaller sizes, it is preferable to make use of special glass temperature control provisions in conjunction with the outlet ring. The outlet ring 85 therefore is shown as differing from the outlet ring 34 in features pertaining to its heat dissipating or conducting characteristics. It is sufficient at this point to note that the outlet ring 85 is provided with a transverse bottom groove or recess 89 in the division wall thereof between the orifices and that a cooling device 90 is provided in conjunction therewith for retarding loss of heat from the glass through the division wall.

The plunger 40b preferably is operated at a slightly higher level than the plungers 40 and 40a when used for the production of charges of any given size.

In Figs. 9 and 10, I show a plunger 40c having a lower end portion 74c of still another type. The portion 74c of this plunger may be circular in cross section and is formed with a rounded lower end, such as that indicated at 91. The plunger 40c acts uniformly on the glass passing downwardly to both the front orifice 86 and the rear orifice 84 of the associate outlet ring 85 and also provides similar vertical passages for flow of glass from the supply body downwardly to these orifices when the plunger 40c is centered in the well 33. Adjustment of the plunger 40c fore or aft to regulably control and equalize weight of the charges obtained may be made use of without substantial change of the shape controlling effect of the down stroke of the plunger on the charge masses in suspension below the respective orifices in view of the rounded configuration of the lower end of such plunger. As indicated, an outlet ring 85 having special cooling provisions for its intermediate portion is preferred for use in conjunction with the plunger 40c as in the case of the plunger 40b. Also, the plunger 40c preferably is operated at a higher level than either the plunger 40 or 40a for controlling the feeding of glass to produce charges of any given size.

Outlet ring structures

As previously explained, I prefer and it is of advantage at times to use outlet rings of different structures and having different heat conducting characteristics. The outlet ring 34 is a refractory member which forms a slightly tapering bottom extension of the well 33 and has the orifices 35 and 36 formed in the bottom thereof, the division wall between these orifices comprising only the refractory material of which the outlet ring is composed.

The outlet ring 34 may be mounted within an outer metallic casing 92, Figs. 1, 2, 3, 13 and 15, which confines insulation 93 against the refractory ring except at the division wall 79 between the feed orifices. The shell or casing 92 fits in a seat in an arm 94 which is hinged at 95, Fig. 3, to the metallic casing or shell of the glass feeding container. The arrangement permits the outlet ring structure to be swung as a unit to and from its operative position. A latch 96 is adapted to engage with a depending lug on the rearward end of the arm 94 to retain the outlet structure in its operative position. An indexing pin 97 on the arm 94 engages an opening in an ear 98 on the outlet ring shell 92 to indicate and maintain the appropriate position of the orifices 35 and 36 with relation to the other parts of the feeding apparatus. As shown, these orifices are in line fore and aft of the feed chamber.

The outlet ring 85, hereinbefore referred to as preferred for use with the plunger 40b or plunger 40c, is shown in detail in Figs. 4 to 6, inclusive. This outlet ring fits in a shell 92a which, like the shell 92, is adapted to be mounted in the arm 94. The transverse groove or channel 89 in the division wall between the orifices 86 and 84 is cooled by air or other cooling fluid from a nozzle 99 which is formed on a casting 100 in the bottom portion of the shell 92a. The casting 100 has a passage 101 for conducting cooling fluid to the nozzle 99 which may have a plurality of upwardly facing discharge orifices 102. The bottom of the shell 92a may be open at 103 beneath the nozzle 99 to permit exhaust or draining away of the cooling fluid. The casting 100 may have up-turned lugs or projections as at 104, filling the spaces at the ends of the cooling channel 89 to prevent entrance of loose granular insulating material, indicated at 105 into the cooling space. Cooling fluid may be supplied to the cooling passage 101 and thence to the nozzle 99 from any suitable source of supply, represented by a supply pipe 106 which is connected with the casting 100 through a suitable opening in the side of the shell 92a. Regulable cooling of the division wall between the orifices may be made use of to oppose or overcome the tendency of the glass in the portions of the orifices adjacent to such wall to run hotter than the glass adjacent to the opposite walls of the orifices. Thus, the outlet structure shown in Figs. 4 to 6, inclusive, may be utilized to obviate or cure a condition which otherwise would result in the canting of the successive accumulating mold charge masses forwardly and rearwardly as such masses accumulate in suspension below the feed orifices.

Figs. 7 and 8 illustrate another form of outlet structure. An outlet ring 85a has a transverse bottom channel 89a between the orifices 86a and 84a substantially as has been described in connection with the orifice ring 85. However, in this instance, the channel 89 is filled with insulation, indicated at 107 in Fig. 8, similar to that employed to fill the remaining spaces in the shell 108 around the refractory outlet ring. In this instance, the bottom of the shell is suitably formed to retain the insulation 107 in the channel 89a. The shell 108 otherwise may be the same as or not substantially different from the shells 92a and 92, being designed to be carried by the pivoted arm 94 like either of the other outlet ring structures.

The outlet ring structure shown in Figs. 7 and 8 is effective to reduce loss of heat from the glass at the outlet to a minimum both through the outlet ring walls at the remote sides of the orifices and through the common division wall between such orifices. This outlet ring structure has advantages under certain operating conditions, as when the feeding apparatus is being employed to produce relatively small charges and particularly to prevent unduly protracted and extensive clogging of the orifices by "frozen" glass when flow therethrough has been stopped temporarily for any reason.

Shear mechanism

The shear mechanism comprises a pair of upper and lower blades 109 and 110, respectively, for the front feed orifice and a pair of upper and lower blades 111 and 112, respectively, for the rear feed orifice. As best seen in Fig. 18, these blades preferably are V-edged. The blade 110 is secured fixedly by its slotted portions and fastening devices 113 cooperative therewith to a lateral arm 114 on a holder 115. The blade 112 is similarly fastened by slotted portions thereof and fastening devices 116 to an arm 117a on a cap 117 which is fastened to the holder 115 so that the cap and the blade 112 may be rocked vertically about an axis 118, Figs. 17 and 18, extending longitudinally of the holder 115. The holder 115 is provided with spaced V-shaped bearing portions 202 in which rest convexly curved bearing portions 203 of the cap 117. Cap screws 204 extend through clearance openings in the holder 115 and are threaded into openings in oppositely extending lateral ears 205 on the cap 117. When one of the cap screws 204 is loosened and the other tightened, the cap 117 and the blade 112 will be rocked as a unit in the bearing portions 202 of the holder 115 about the axis 118 in one direction or the other, depending on which of the cap screws 204 is loosened while the other is tightened. The holder 115 has an end shank 115a secured in place in a socket in the outer end portion of the shear arm 119.

Both the upper shear blades 109 and 111 are adjustably secured by slotted portions thereof and fastening devices 219 and 120, respectively, to lateral arms 121a and 122a, respectively, of cap members 121 and 122, respectively. These cap members are fastened to a shear holder 123 so that blades 109 and 111 may be adjustably rocked about horizontal axes 124 and 125, respectively, each of which extends at a right angle with the direction of length of the holder 123. The bearing and fastening means employed to mount each of the cap members 121 and 122 on the holder 123 is similar to the means described in detail for mounting the cap 117 on the holder 115 except of course the cap 117 is mounted for rocking adjustment about an axis extending in the direction of length of its holder and of its supporting shear arm while the caps 121 and 122 are both mounted for rocking adjustments about axes extending at right angles with the direction of length of their holder and of their supporting shear arm. The holder 123 has an end shank 123a secured in a socket in the outer end portion of the shear arm 126 so that the holders 115 and 123 are substantially parallel when the blades are closed, as shown in Figs. 17 and 18.

The shear arms 119 and 126, respectively, are mounted to swing about the axes of parallel vertical shafts 127 and 128, respectively. The hub portions of these arms may be provided with co-engaging gears 129 and 130, respectively, so that swinging movement of one shear arm about the axis of its pivotal support will effect like movement of the other arm in the opposite direction and to the same extent.

The pivot shafts 127 and 128 for the shear arms are supported in a housing 131, Figs. 1 and 3, which is pivoted intermediate its heighth at its inner side by a horizontal pivot shaft 132, Fig. 3, to a slide block 133 which is adjustable vertically in a slideway 134 in a front wall portion of the casing of the glass feeding container. The vertical adjustment of the slide block 133 and hence of the housing 131 and the entire shear mechanism as a unit may be effected by manipulation of an adjustable retaining screw 135. The shear mechanism may be tilted about the axis of the horizontal shaft 132 to raise or lower the shear blades for the rear feed orifice above or below the shear blades for the front orifice when these shear blades are at their cutting positions beneath such orifices. This tilting adjustment may be effected by manipulation of co-operative adjustable fastening devices 136 and 137, which respectively are provided between the housing 131 and the slide block 133 below and above the level of the pivot shaft 132. Of course, these adjustable devices may be manipulated or set to maintain the front and rear shear blades at the same level and this is the usual or normal setting of such blades. The distance below the orifice at which the blades will sever charges from the suspended mold charge masses will be determined principally by vertical adjustment of the entire shear assembly, including the slide block 133. The tilting adjustment of the shear blades may be utilized to compensate for the different rates of flow of glass from the respective orifices so that charges of equal weight will be severed from the suspended mold charge masses by the simultaneous action of the front and rear pairs of blades despite slightly unequal lengths of the respective suspended charge masses.

The pairs of shear blades should cut cleanly through the suspended charge masses simultaneously. The fastening means described by which the blades are secured to their respective holders and by such holders to the shear arms permits rocking of the upper rear blade 109 about an axis extending at a right angle with the direction of length of its holder until the cutting edge of such blade contacts uniformly at opposite sides of the apex of its cutting edge with like portions of the edge of the cooperative lower blade 110 when these shear blades are closed. The rocking adjustment of the lower rear shear blade 112 about the longitudinal axis of its holder and the rocking adjustment of the cooperative upper rear shear blade 111 about an axis at right angles with the longitudinal axis of its holder or substantially at right angles with the rocking movement of the blade 112 permits the rear blades to be set for proper cutting contact at opposite sides of the apices of their edge portions when these blades are closed concurrently with the front blades 109 and 110. To compensate for different slight variations in the edge portions of the blades, resulting from grinding of the blades of one pair more than the blades of the other or of one blade of a pair more than the other blade of the same pair or some generally similar cause, the blades of each pair can be independently adjusted edgewise relatively to one another by means of the slotted connections of such blades with their carrying arms. This adjustment is in addition to and independent of the main "overlap adjusting mechanism" (not shown) of the shear mechanism.

Except for the features which have been particularly pointed out, relating to the provision of the separate pairs of shear blades for the front and rear feed orifices, respectively, and the novel adjustable features of the connections between such blades and their holders and the structural provisions by which the entire shear mechanism, except a slide block 133, may be rocked about the axis of the shaft 132, the shear mechanism may be substantially like that which is included in the well known Hartford single feeder and is fully disclosed in Patent No. 1,760,435, granted May 27, 1930, to Karl E. Peiler, assignor to The Hartford-Empire Company. The shear mechanism thus may include means such as are disclosed in said Patent No. 1,760,435 for effecting relative vertical adjustments between the two shear arms, and therefore between the elements respectively carried thereby, to produce the desired tension of the edge portions of the blades of each pair on each other during severing operations, means for adjusting simultaneously and in unison the overlap of the blades of the respective pairs at the completion of the swinging movements of the shear arms toward each other, and means for effecting repeated swinging movements of the shear arms toward and away from each other as required to effect suitably timed periodic cutting operations by the shear blades.

*Mechanism for steadying and guiding the charges*

This mechanism is shown best in Figs. 19 and 20. It comprises a pair of levers 138 and 139, respectively, both fulcrumed at 140 on a vertical pivot shaft carried by the shear arm 126. This is the shear arm which supports and operates the upper shear blades. The outer end portions of the levers 138 and 139 carry anti-batting guide members 141 and 142, respectively, for steadying the charges severed from successive charge masses in suspension below the front and rear orifices. Each of these guide members preferably is of arcuate shape, as viewed in plan, to correspond approximately to the lateral shape of the portion of the charge to be contacted by such guide member during the severing operation.

Each guide member has a shank 143 secured, as by a fastening device 144, to one arm 145 of a bell crank lever 146 which is fulcrumed at 147 on a vertical pivot pin carried by the free end portion of the lever 138 or the lever 139. The other arm, indicated at 148, of the bell crank lever has an upward projection 149, which may be a pin, extending between flanges 150 and 151, respectively, on an inner sleeve 152 and an outer sleeve 153. The sleeve 152 threadedly engages a screw 154, carried by a down turned flange or lug 155 on the lever 138 or the lever 139. A hand wheel 156 is provided on the free end of the sleeve 152. A compression spring 157 encircles the sleeve 153 and bears at its opposite ends against the flange 151 and the hand wheel 156, respectively. Each guide 141 or 142 may thus be independently adjusted about the axis of its pivotal connection with its supporting lever, 138 or 139, and at the same time the adjusting means allows the guide to yield under an abnormal stress. Thus, by turning the hand wheel 156, the sleeves 152 and 153 are adjusted as a unit about the axis of the screw 154 and relatively to the supporting lever, 138 or 139. In the event of abnormal stress on the face of the guide, 141 or 142, the resultant abnormal pressure of the pin or projection on the arm 148 of the bell crank lever against the flange 151 of the sleeve 153 will drive the latter rearwardly against the action of the spring 157 and thus permit the guide to swing momentarily away from its normal adjusted position.

Each lever 138 or 139 is adjustably connected at its rear end with the supporting shear arm. The construction shown for the upper lever 138 in Fig. 19 is duplicated for the lever 139 so that the description of the rear end portion of the lever 138 will suffice also for the corresponding portion of the lever 139. As shown, the rear end portion of the lever 138 comprises horizontally spaced branches 158 and 159, respectively. An adjusting screw 160 is threaded through the outer end portion of the branch 159 and bears against an abutment plate 161 which is carried by the adjacent portion of the lever arm 126. A compression spring 162 is disposed between the branch 158 and the adjacent side of the plate 161, being retained in place by a projection 163 on the plate. The adjusting screw 160 is provided with a suitable operating rod, a portion of which is indicated at 164, operable at a distance from the shear mechanism and during the operation thereof, as in the case of the operating rod 152 of the mold charge guiding means shown in Fig. 1 of my prior Patent No. 1,915,339, granted March 6, 1934, to me as assignor to the Hartford-Empire Company. The adjustment of each guide 141 or 142 that can be effected by the adjusting screw 160 will dispose the guide in a predetermined relation to the cutting edge of the associate upper shear blade so that the guide will steady and guide each glass charge at the time of its severance and oppose the tendency of the cooperative lower blade to bat the charge laterally as it is severed. This adjustment permits the use of the same guide during the production of charges of a wide variety of sizes.

The adjustment effected by the hand wheel 156 supplements the adjustment of each guide that may be made by the adjusting screw 160 and adjusts the guide horizontally in directions substantially at right angles with the direction of adjustment by the screw 160.

The adjustment may be made with extreme accuracy and precision, whereby the ultimate positions of the guides may be finely adjusted and varied within wide ranges. This is of practical importance and of decided utility in the operation of apparatus by which a plurality of charges are to be severed at the same time from adjacent suspended mold charge masses and the severed charges properly delivered to the mold cavities of associate glassware forming machinery.

What I claim is:

1. Glass feeding apparatus comprising a glass feeding container having a well in its bottom portion and a plurality of adjacent feed orifices at the bottom of said well, a vertical refractory implement depending into said well in spaced relation with the walls thereof for controlling flow of glass to and through all of said feed orifices, means for adjusting said implement horizontally in a plurality of different directions selectively, including directions extending substantially at right angles with each other, and means for adjusting said implement angularly about its vertical axis.

2. Glass feeding apparatus comprising a glass feeding container having a well in its bottom portion and a pair of adjacent feed orifices at the bottom of said well, a vertical refractory implement depending into said well for controlling flow of glass to and through all of said orifices, said implement having its lower end portion beveled downwardly at the sides thereof next to said orifices, and means for adjusting said implement horizontally along a line extending across said orifices.

3. Glass feeding apparatus comprising a feeding container having a well in its bottom portion and a pair of adjacent feed orifices at the bottom of said well, a vertical refractory implement depending into said well for controlling flow of glass to and through said orifices, said implement having its lower end portion beveled downwardly at the sides thereof next to said orifices and having vertically extending grooves in the beveled faces thereof above said orifices, and means for adjusting said implement horizontally to vary the positions of the opposite beveled and grooved faces of the lower end portion of said implement relatively to the adjacent orifices.

4. Glass feeding apparatus comprising a feeding container having a well in its bottom portion and a pair of adjacent feed orifices at the bottom of said well, a vertical refractory implement depending into said well for controlling flow of glass to and through both of said orifices, said implement having its lower end portion beveled downwardly toward the vertical axis of the implement at the side thereof next to one of said feed orifices, and means for adjusting said implement horizontally to vary the position of the beveled face of said implement in respect to the adjacent orifice.

5. Glass feeding apparatus comprising a glass feeding container having a well in its bottom portion and a pair of adjacent feed orifices at the bottom of said well, said orifices being spaced apart by a division wall constituting a portion of the bottom of the well, a vertical refractory implement reciprocable in the glass in the container to control flow of glass through both of said orifices, said implement having its lower end portion beveled at the sides thereof nearest to said orifices and having a lower end surface of suitable size and shape to overlie the division wall between the orifices without overlying said orifices when the implement is centered in the well, whereby said implement will exert flow accelerating impulses on the glass at all of said orifices by pressure exerted through the glass in the well when the implement is moving downward in substantially co-axial relation with the well.

6. Glass feeding apparatus comprising a glass feeding container having a well in its bottom portion, an outlet ring located at the bottom of said well and having a pair of adjacent feed orifices therein, a vertically reciprocable plunger depending into the well when the plunger is at the lower end of its stroke for controlling flow of glass to and through both of said orifices, means for reciprocating the plunger, means for adjusting the plunger horizontally in relation to opposite walls of said well, and means for locally cooling only the portion of the outlet ring that is located between said orifices.

7. Glass feeding apparatus comprising a feeding container having a well in its bottom portion, an outlet ring at the bottom of said well, said outlet ring having a pair of adjacent feed orifices therein and having an external channel at its lower surface located wholly between said orifices, and a cooling device located adjacent to said channel for applying a cooling fluid to the walls thereof.

8. Glass feeding apparatus comprising a feeding container having a plurality of adjacent feed orifices in its bottom portion through which molten glass may issue and accumulate in suspended mold charge masses, separate pairs of shear blades for the respective orifices and means for mounting and operating all said pairs of blades in unison to cause each pair of blades periodically to sever a charge from the mass of glass in suspension below its particular orifice, means for adjusting the distance from their respective orifices of all the pairs of blades in unison, and means for effecting differential adjustment of the distances of the respective pairs of blades from their orifices.

9. Glass feeding apparatus comprising a feeding container having a pair of adjacent feed orifices in its bottom portion through which molten glass may issue and accumulate in a pair of adjacent concurrently formed suspended mold charge masses, pairs of shear blades individual to the respective feed orifices, a pair of pivoted shear arms supporting said pairs of shear blades and swingable relative to each other periodically to close the blades of each pair to cut a charge from the mass of glass in suspension below its particular orifice, means for operating said shear arms, means for relatively adjusting the blades of each pair independently of the blades of the other pair, means for adjusting said shear arms vertically in unison to vary simultaneously and to the same extent the distance of the respective pairs of blades from their particular feed orifices, and means for tilting said shear arms vertically to vary to different extents the distances of the respective pairs of shear blades from their particular orifices.

10. Glass feeding apparatus comprising a feeding container having a pair of adjacent feed orifices in its bottom through which molten glass may issue and form a pair of concurrently produced suspended mold charge masses, severing mechanism operable periodically to sever charges from said suspended mold charge masses, said severing mechanism comprising a pair of cooperative relatively swingable pivoted shear arms and pairs of blades individual to the respective orifices carried by said shear arms and operated thereby, one of said arms carrying the upper blades and the other arm carrying the lower blades of said pairs, and separate means for steadying and guiding the charges severed by the respective pairs of blades from the respective suspended mold charge masses at the time of severance of said charges, said means for steadying and guiding the charges comprising a pair of intermediately pivoted levers carried by the shear arm for the upper shear blades, a pair of bell crank levers respectively mounted on the ends of said first named levers adjacent to the pairs of shear blades, charge steadying and guiding members carried by said bell crank levers, means adjustably connecting the bell crank levers with said first named levers, and other means adjustably connecting the opposite end portions of said first named levers with the shear arm on which said levers are mounted.

11. The method of feeding molten glass for the production of mold charges which comprises superimposing a supply body of the molten glass upon a pair of adjacent discharge orifices so that glass tends to flow by gravity from the supply body downwardly through said orifices, periodically modifying gravity flow of glass through said orifices by reciprocating a vertical implement vertically in the glass above said orifices so that the vertical path of reciprocation of the implement is centered between the center lines of the two discharge orifices when the gravity flow is symmetrical throughout the entire cross-section of the lower end of each discharge orifice and is the same for both discharge orifices, and varying the relative gravity-flow modifying effects of the reciprocations of the implement on the glass at the several orifices to compensate for differences between the rates of gravity flow of glass of the supply body downwardly toward said orifices by shifting horizontally the position of the vertical path of reciprocation of the implement in the glass above said orifices.

12. The method of feeding molten glass from a parent body in simultaneously produced series of mold charges, the several charges of the respective series being similar in shape and weight, that comprises flowing glass downwardly from the parent body around the lower end of a reciprocating discharge-controlling implement in a glass-discharge well and through a plurality of submerged orifices in the bottom of the well, regulably controlling the temperature and viscosity of the glass of the parent body flowing to said well in an attempt to cause like masses of molten glass, each containing at least enough glass for a mold charge, to issue from and accumulate in suspension below the several orifices for each cycle of reciprocation of the implement, severing mold charges from the pendant mold charge masses below the several orifices simultaneously at the ends of intervals of time of sufficient duration to permit said pendant charge masses to attain the desired shape and size, and shifting the reciprocating discharge-controlling implement laterally from a centered position in the well in the direction and to the extent required to maintain substantial uniformity of weight of the severed charges whenever differences between the downward flow movements of glass from the parent body to said orifices would otherwise prevent such substantial uniformity.

13. The method of obtaining simultaneously a plurality of similar mold charges, each of appropriate shape and weight, which comprises extruding molten glass through a plurality of adjacent orifices submerged in a glass supply, and so varying the extrusive pressures applied to the different portions of the glass above the respective orifices in accordance with variations in the temperature and viscosity of such different portions of the glass as to cause like mold charge masses of the glass to issue from and accumulate in suspension below the several orifices in a given period of time, and severing like mold charges from said maseses simultaneously at the end of said period of time.

14. Glass feeding apparatus comprising a feeding container having a pair of adjacent feed orifices in its bottom through which molten glass may issue and form a pair of concurrently produced suspended mold charge masses, and severing mechanism operable periodically to sever charges from said suspended mold charge masses, said severing mechanism comprising a pair of cooperative substantially horizontal shear arms pivoted to swing toward and away from each other about adjacent vertical axes, pairs of blades individual to the respective orifices carried by said shear arms and operated thereby, the respective blades of said pairs extending laterally from the respective shear arms in positions to be closed beneath and in line with the respective orifices by swinging movements of said arms toward each other, one of the blades carried by one of said arms being fixedly secured to the latter, the other blade carried by the same arm being connected with said arm for rocking adjustment relative to the arm about an axis extending in the direction of length of said arm, and both the blades carried by the second shear arm being connected with the latter for independent rocking adjustments relative to said second arm about axes extending approximately at right angles with the direction of length of said arm.

15. The method of feeding molten glass in successive pairs of concurrently produced mold charges which comprises superimposing a supply body of molten glass upon a pair of adjacent discharge orifices to cause flow of glass by gravity from the supply body downwardly to and through said orifices so as to accumulate in suspended mold charge masses below said orifices, severing mold charges from the suspended mold charge masses below said orifices when the suspended charge masses have attained the length desired, and modifying gravity flow of glass from said supply body through said orifices by causing differential extraction of heat from the glass in the portions of said orifices next to the inner and outer sides thereof, respectively, to compensate for differential flow movements through these portions of the orifices which, if uncompensated, would cause lateral warping of the mold charge masses in suspension from said orifices.

16. The method of feeding molten glass from a parent body in successive simultaneously produced pairs of mold charges, the two charges of each pair being similar in weight and shape, that comprises flowing glass downwardly from the parent body around the lower end of a vertically reciprocating discharge controlling implement in a glass discharge well and through a pair of adjacent glass submerged orifices at the bottom of the well to produce below the orifices pairs of suspended mold charge masses, each containing at least enough glass for a mold charge, extracting relatively more heat from the glass passing downwardly through the portions of said orifices next to the inner side walls thereof than from the glass in the portions of the orifices next to the outer side walls thereof to prevent lateral outward warping or canting of the mold charge masses in suspension from said orifices, and severing mold charges from the suspended mold charge masses below said orifices.

17. The method of feeding molten glass from a parent body in successive simultaneously produced pairs of mold charges, the two charges of each pair being similar in weight and shape, that comprises flowing glass downwardly from the parent body around the lower end of a vertically reciprocating discharge controlling implement in a glass discharge well and through a pair of adjacent glass submerged orifices at the bottom of the well to produce below the orifices pairs of suspended mold charge masses, each containing at least enough glass for a mold charge, applying a cooling medium locally to the walls at the inner sides only of said orifices to prevent lateral outward canting or warping of the glass of the mold charge masses in suspension from said orifices, and severing mold charges from the suspended mold charge masses below said orifices.

WILLIAM T. BARKER, Jr.